(12) United States Patent
Williams et al.

(10) Patent No.: US 7,612,522 B2
(45) Date of Patent: Nov. 3, 2009

(54) MOTOR DRIVE CONTROL WITH A SINGLE CURRENT SENSOR USING SPACE VECTOR TECHNIQUE

(75) Inventors: Connel Brett Williams, Leamington Spa (GB); Jeffrey Ronald Coles, Solihull (GB); Adrian Szabo, Solihull (GB); Christopher David Dixon, Coventry (GB); Jiang Li, Birmingham (GB); Abbas Ahmad Fardoun, Dearborn, MI (US)

(73) Assignees: TRW Limited (GB); TRW Automotive US LLC, Livonia, MI (US)

( * ) Notice: Subject to any disclaimer, the term of this patent is extended or adjusted under 35 U.S.C. 154(b) by 42 days.

(21) Appl. No.: 11/983,196

(22) Filed: Nov. 7, 2007

(65) Prior Publication Data
US 2008/0079377 A1 Apr. 3, 2008

Related U.S. Application Data

(60) Division of application No. 11/006,460, filed on Dec. 7, 2004, now Pat. No. 7,308,192, which is a continuation of application No. PCT/GB03/02466, filed on Jun. 5, 2003.

(30) Foreign Application Priority Data
Jun. 7, 2002 (GB) .................................. 0213098

(51) Int. Cl.
*H02P 1/26* (2006.01)
(52) U.S. Cl. .................................. 318/819; 318/400.01
(58) Field of Classification Search ................. 318/819, 318/400.01
See application file for complete search history.

(56) References Cited

U.S. PATENT DOCUMENTS

| | | | | |
|---|---|---|---|---|
| 4,888,533 A | * | 12/1989 | Gotoh et al. | 318/524 |
| 4,994,950 A | * | 2/1991 | Gritter | 363/41 |
| 5,309,349 A | | 5/1994 | Kwan | |
| 5,955,862 A | | 9/1999 | Nguyen | |
| 7,545,110 B2 | * | 6/2009 | Williams et al. | 318/268 |
| 2003/0173946 A1 | * | 9/2003 | Liu et al. | 324/107 |

OTHER PUBLICATIONS

Blaabjerg, F. et al: "Single Current Sensor Technique In The DC Link Of Three-Phase PWM- VS Inverters: A Review And A Novel Solution", IEEE Transaction on Industry Applications, IEEE Service Center, Piscataway, NJ, US, vol. 33, No. 5, Sep. 1997, pp. 1241-1253, XP000739841 ISSN: 0093-9994 — paragraph [OIIA]; figure 3.

(Continued)

*Primary Examiner*—Walter Benson
*Assistant Examiner*—Renata McCloud
(74) *Attorney, Agent, or Firm*—MacMillan, Sobanski & Todd, LLC

(57) ABSTRACT

A drive system for a three phase brushless AC motor is arranged to optimize the transistor switching pattern to improve power output whilst allowing current measurement in all of the phases using a single sensor. This is achieved by defining voltage demand vectors x where more than two states are required to meet a minimum state time requirement determined by the single sensor method, and calculating three or more state vectors which produce the demanded vector x whilst still allowing single current sensing. Various methods of optimising the PWM pattern so as to give maximum output whilst using single current sensing are also disclosed.

8 Claims, 15 Drawing Sheets

OTHER PUBLICATIONS

Haras, A. Ed—EPE Association: "Space Vector Modulation In Orthogonal And Natural Frames Including The Overmodulation Range", EPE '97. $7^{th}$. European Conference On Power Electronics And Applications. Trondheim, Sept. 8-10, 1997, EPE . European Conference On Power Electronics And Applications, Brussels, EPE Association B, vol. 2 Conf. 7, Sep. 8, 1997, pp. 2237-2342, XP000792303 ISBN: 90-75815-02-6; p. 2.341, left-hand column; figure 12.

* cited by examiner

State 1 : [100] 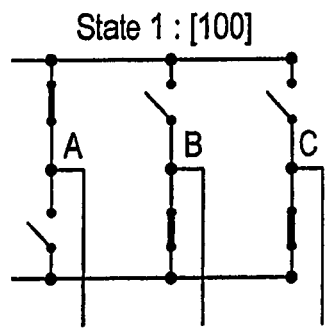
State 2 : [110] 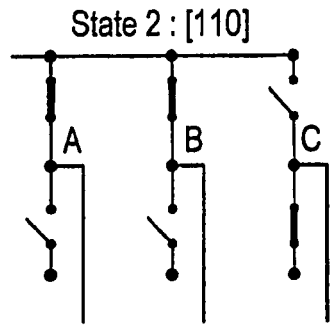
State 3 : [010] 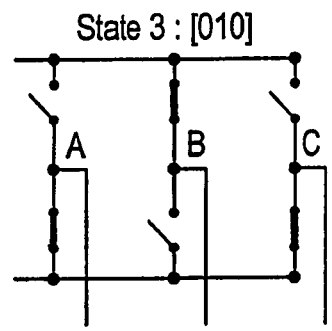
State 4 : [011] 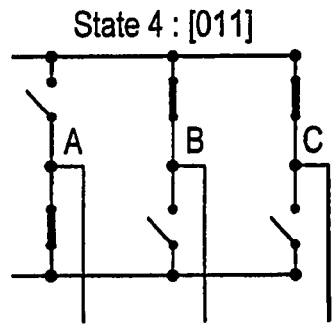
State 5 : [001] 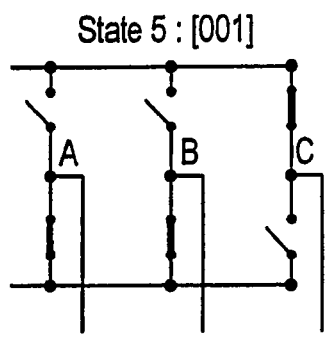
State 6 : [101] 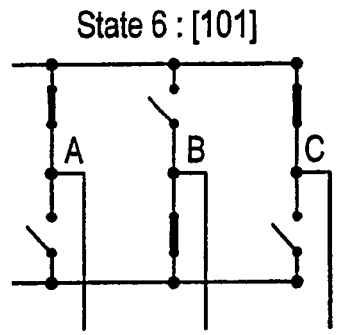
State 0 : [000] 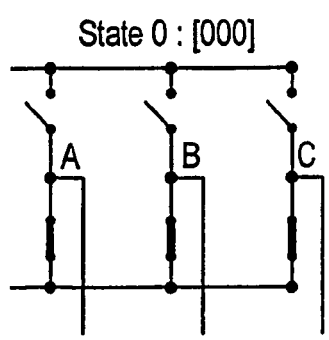
State 7 : [111] 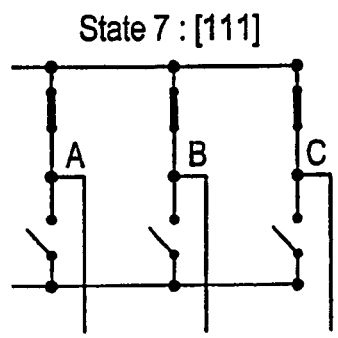
*Fig.3*

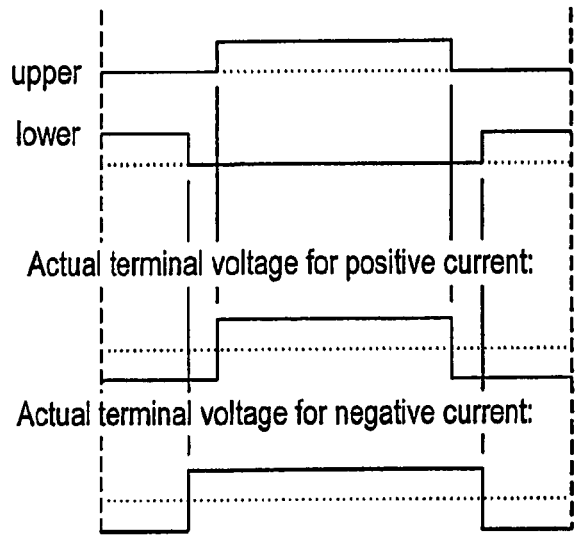
Fig. 8a
Fig. 8b
Fig. 8c
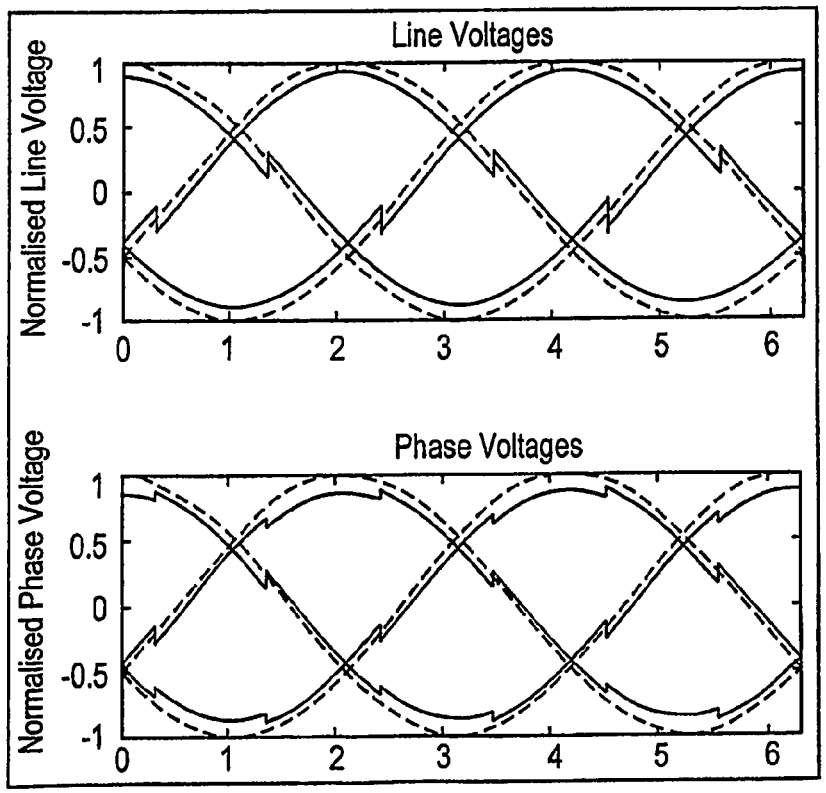
Fig. 9a
Fig. 9b

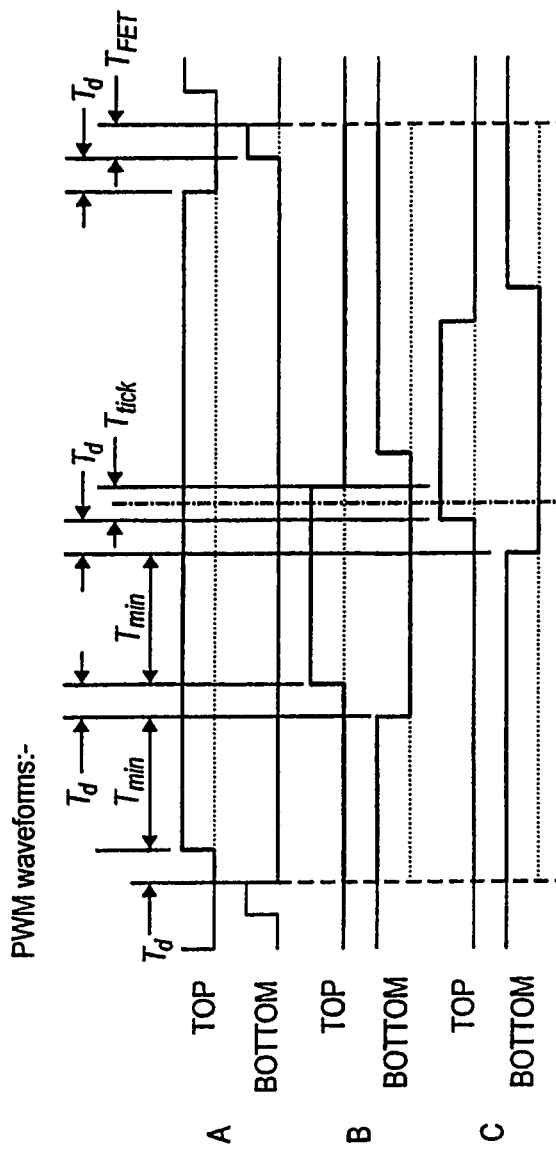
*Fig.10a*
*Fig.10b*
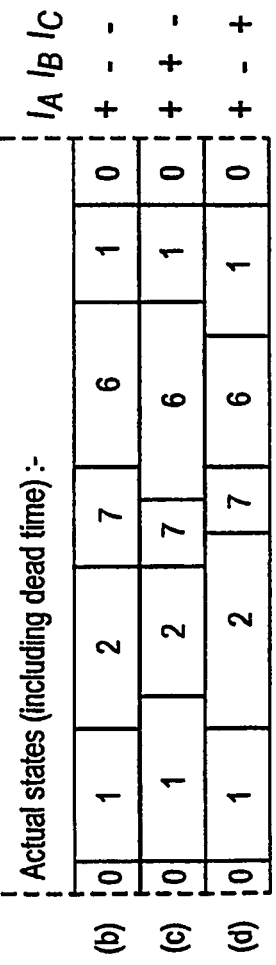
*Fig.10c*

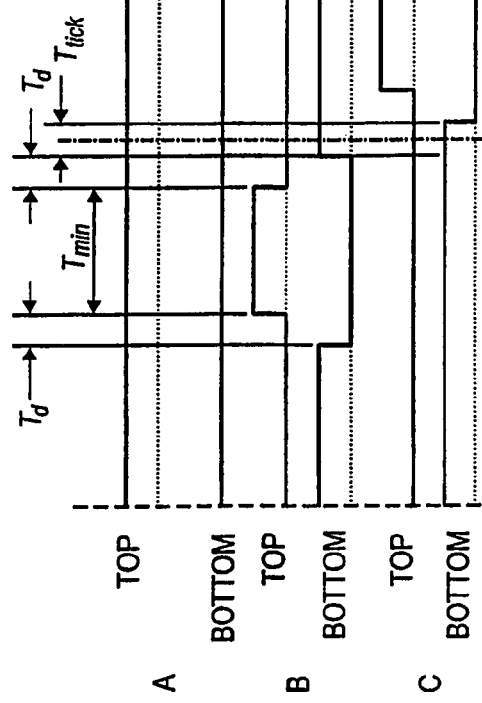

MOTOR DRIVE CONTROL WITH A SINGLE CURRENT SENSOR USING SPACE VECTOR TECHNIQUE

CROSS-REFERENCE TO RELATED APPLICATIONS

This application is a Divisional Application of U.S. patent application Ser. No. 11/006,460, filed on Dec. 7, 2004, now U.S. Pat. No. 7,308,192 which is a continuation of International Application No. PCT/GB03/02466, filed Jun. 5, 2003, which claims priority from U.K. Patent Application No. 0213098.7, filed Jun. 7, 2002. The disclosures of all of the above listed applications are incorporated herein by reference.

BACKGROUND OF THE INVENTION

This invention relates to electric motor control, and in particular to pulse width modulation (PWM) control of multiple phase brushless motors.

Control systems for electric motors need to measure the current through the windings or phases of the motor and this can either be done by means of separate current sensors for all of the phases, or by means of a single current sensor that is placed in the circuit so as to measure the total instantaneous current flowing between a D.C. power supply and the bridge circuit and motor combination. In a single current sensor system, the multiple motor phase currents are derived by offsetting the PWM patterns of the switches which apply the required voltage to each phase, and sampling the current sensor at appropriate points. Under certain configurations this can place constraints on the PWM pattern that limit the maximum fundamental phase voltage that can be produced.

SUMMARY OF THE INVENTION

It is an aim of the invention to maximize the magnitude of the fundamental phase voltage produced by a single current sensor drive system.

Accordingly the present invention provides a drive system for a multi-phase brushless motor comprising a plurality of phases, the system comprising a drive circuit including switch means associated with each of the phases for varying the electric potential applied across each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, wherein the control means is arranged such that, under some circumstances, when the switch means for two of the phases are switched during a single pulse width modulation period, all switching of the switch means associated with one of said two phases during the period can be completed before any switching of the switch means associated with the other of said two phases is begun.

The present invention further provides a drive system for a multi-phase brushless motor comprising a plurality of phases, the system comprising a drive circuit including switch means for varying the electric potential applied across each of the windings by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, wherein there is a dead time associated with switching each of the phases and the control means is arranged such that, in a period during which the circuit is in a first state for a first state time and two other states for respective shorter state times, a gap left between the two shorter state times of sufficient length to avoid overlap of their associated dead times. This means that, at high voltage demands, the occurrence of zero-volt states between the two shorter state times can be avoided.

The present invention further provides a drive system for a multi-phase brushless motor comprising a plurality of phases, the system comprising a drive circuit including switch means for varying the electric potential applied to each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, wherein the control means is arranged to control the switching times of the switch means so that sufficient time is spent in a sufficient number of active states for the current in each of the phases to be determined by means of the current sensor, and so that the sum of the state times in which the drive circuit is in the active states during each pulse width modulation period can increase to 100 percent of that period.

Alternatively, or in addition, each phase can preferably be switched to a constant switched state, either on or off, for the whole period.

The present invention still further provides a drive system for a multi-phase brushless motor comprising a plurality of phases, the system comprising a drive circuit including switch means for varying the electric potential applied to each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, wherein the control means is arranged to control the switching times of the switch means so that sufficient time is spent in a sufficient number of active states for the current in each of the phases to be determined by means of the current sensor, and the control means is arranged to use state vector modulation to determine times which the circuit spends in each of the states in each period.

The present invention still further provides a drive system for a multi-phase brushless motor comprising a plurality of phases, the system comprising a drive circuit including switch means for varying the electric potential applied to each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, wherein the control means is arranged to control the switching times of the switch means so that sufficient time is spent in a sufficient number of active states for the current in each of the phases to be determined by means of the current sensor, and the control means is arranged to inhibit a change, between two adjacent periods, of the order in which the switch means are switched within said periods, when the demanded voltage is low, but to allow such change of order when the demanded voltage is high. This can avoid rapid re-ordering of the states within successive PWM periods which can otherwise produce noise and vibration in the motor.

The present invention still further provides a drive system for a multi-phase brushless motor comprising a plurality of phases, the system comprising a drive circuit including switch means for varying the electric potential applied to each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, wherein the control means is arranged to control the switching times of the switch means so that sufficient time is spent in a sufficient number of active states for the current in each of the phases to be determined by means of the current sensor, and the control means is arranged to switch each phase on at a respective on time and off at a respective off time and either the on times or the off times are at predetermined times in each period. This can help to reduce the amount of computation required as at least part of the timing is fixed for each period.

The present invention yet further provides a drive system for a multi-phase brushless motor comprising a plurality of phases, the system comprising a drive circuit including switch means for varying the electric potential applied to each of the phases by switching the drive circuit between a plurality of states, a current sensor connected such that it can sense the instantaneous total current flowing through the windings, and control means arranged to provide pulse width modulated drive signals to control the switch means so as to control the time that the drive circuit switches between said states in each of a series of pulse width modulation periods, wherein the control means is arranged to control the switching times of the switch means so that sufficient time is spent in a sufficient number of active states for the current in each of the phases to be determined by means of the current sensor, and the control means is arranged to abandon current sensing under some operating conditions so as to allow a greater range of pulse width modulation timings. This can increase the maximum available power output of the motor.

Other advantages of this invention will become apparent to those skilled in the art from the following detailed description of the preferred embodiment, when read in light of the accompanying drawings.

BRIEF DESCRIPTION OF THE DRAWINGS

FIG. 3 shows the various possible states of the transistors of the circuit of FIG. 1.

FIGS. 8a through 8c are state timing diagrams showing the effects of dead time on the PWM signals of the system of FIG. 1.

FIGS. 9a and 9b are graphs showing the effect of dead time on the line and phase voltages of the system of FIG. 1.

FIGS. 10a through 10c are timing diagrams showing a first method of operating the system of FIG. 1.

FIGS. 11a through 11c are timing diagrams showing a second method of operating the system of FIG. 1.

DETAILED DESCRIPTION OF THE INVENTION

System Overview

Figure 1:
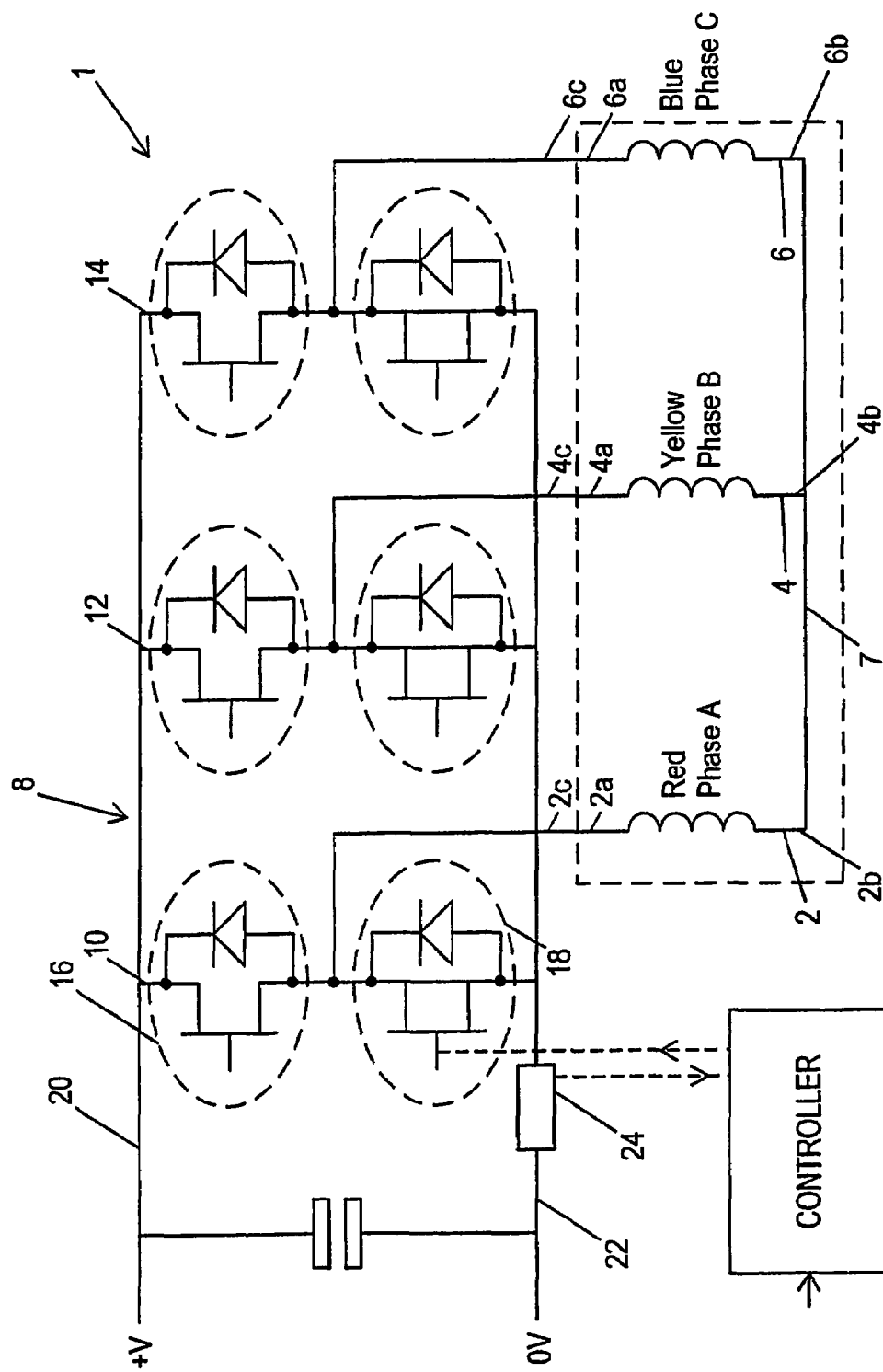
FIG. 1 is a diagram of a drive circuit for a motor according to the invention.

Referring to FIG. 1 a three phase brushless motor 1 comprises three motor windings 2, 4, 6, generally designated as phases A, B and C, connected in a star network. One end 2a, 4a, 6a of each coil is connected to a respective terminal 2c, 4c, 6c. The other ends 2b, 4b, 6b, of the coils are connected together to form the star centre 7. A drive circuit comprises a three phase bridge 8. Each arm 10, 12, 14 of the bridge comprises a pair of switches in the form of a top transistor 16 and a bottom transistor 18 connected in series between a supply rail 20 and ground line 22. The motor windings 2, 4, 6 are each tapped off from between a respective complementary pair of transistors 16, 18. The transistors 16, 18 are turned on and off in a controlled manner to provide pulse width modulation of the potential applied to each of the terminals 2c, 4c, 6c, thereby to control the potential difference applied across each of the windings 2, 4, 6 and hence also the current flowing through the windings. This in turn controls the strength and orientation of the magnetic field produced by the windings.

A current measuring device in the form of a resistor 24 is provided in the ground line 22 between the motor 1 and ground so that it can measure the total current flowing though all of the windings 2, 4, 6. In order to measure the current in each of the windings the total current has to be sampled at precise instances within the PWM period where the voltage applied to each terminal of the winding (and hence the conduction state of a particular phase) is known, as will be explained in more detail below.

Figure 2:
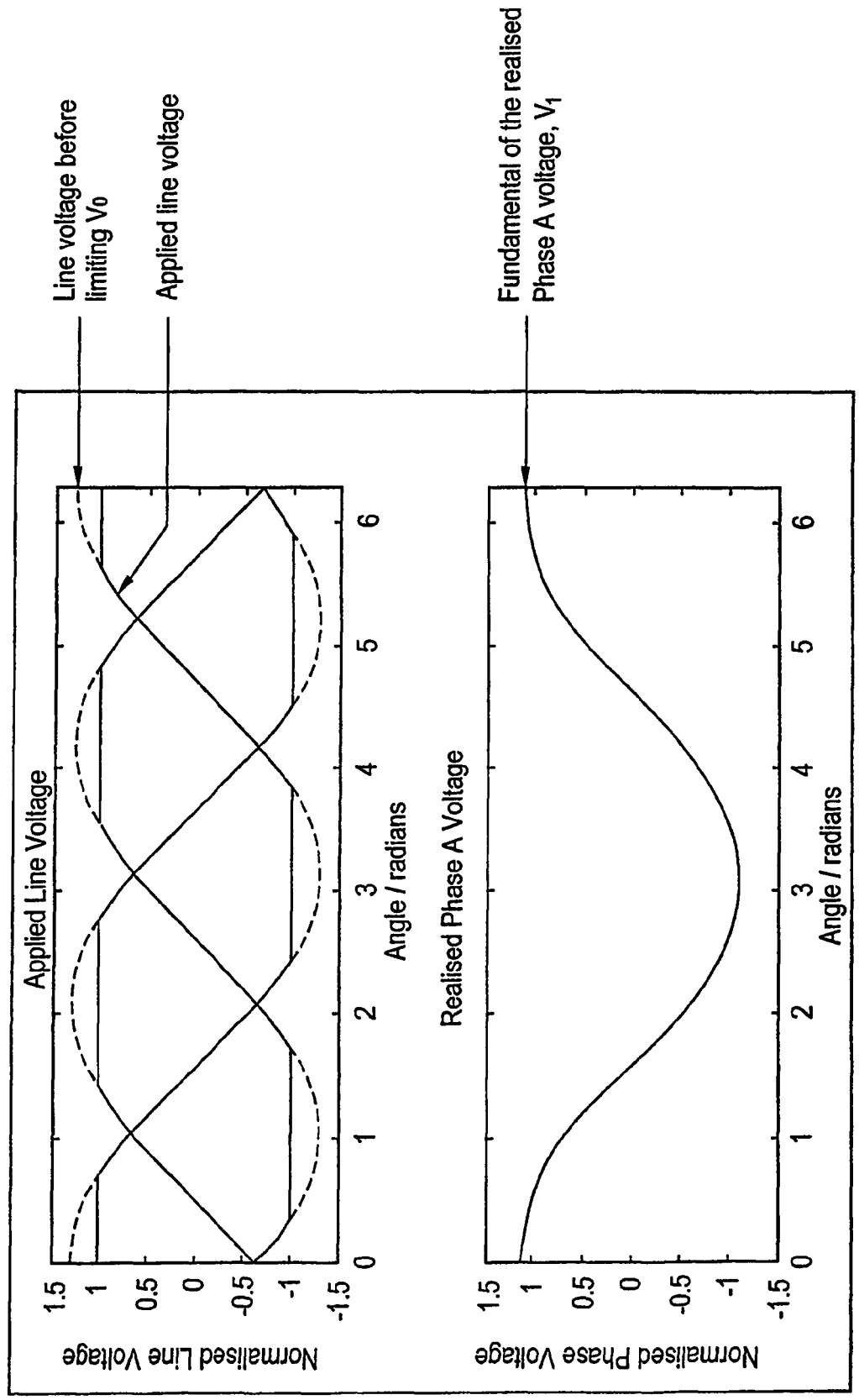
FIG. 2 shows how the line and phase voltages in the motor of FIG. 1 vary with time during one electrical cycle of the motor.

In order to achieve the smoothest operation, the applied phase voltages (the potential difference between the voltage at the terminal 2c, 4c, 6c of the winding and the star point 7) should vary in a sinusoidal manner with one cycle for each electrical revolution of the motor. However, the maximum terminal voltage (the potential difference between the potential at the terminal 2c, 4c, 6c, of the machine and the potential of mid-point of the DC supply), is $v_{dc}/2$ where $v_{dc}$ is the voltage difference between the positive DC supply rail and ground. If only sinusoidal voltages were applied to the machine terminals, the maximum peak phase voltage would also be $v_{dc}/2$. However, referring to FIG. 2, it is possible to increase the effective phase voltage using a known technique referred to as 'overmodulation'. The terminal voltages are made to follow as closely as possible a sinusoidal variation, the amplitude $v_0$ of which is greater than $v_{dc}/2$. Since the terminal voltages cannot actually exceed $v_{dc}/2$, this results in the peaks of the terminal voltage cycle being clipped so that the terminal voltages stay at a constant $\pm v_{dc}/2$ over part of each cycle. In FIG. 2 the terminal voltages are shown as normalized values with $v_{dc}/2$ represented as 1.

Modulation depth is defined herein as $v_0/(v_{dc}/2)$ and will therefore be greater than one for over-modulation.

The resultant phase voltage cycle, that is the variation in the voltage across one of the windings between its terminal 2c, 4c, 6c and the star centre point 7, is also shown in FIG. 2. Again this is normalized with 1 representing the phase voltage produced by a smooth sinusoidal line voltage with a normalized amplitude of 1. It can be seen that, even with over-modulation, the phase voltage follows a reasonably smooth curve, although there is some distortion which can result in vibration and noise in the motor.

The fundamental component of the phase voltage is the component of the voltage whose frequency matches the electrical frequency of the motor. This voltage component is important as it produces the fundamental current component that is responsible for producing the useful motive torque in the machine. The purpose of the invention is to maximize this phase voltage component, whilst minimising the generation of distorting voltage components at other spatial and temporal frequencies. The achieved fundamental voltage magnitude is herein described using the modulation index, which is herein defined as $v_1/(v_{dc}/2)$, where $v_1$ is the magnitude of the fundamental component of the realised phase voltage. It should be noted that although the above argument is presented for a three-phase star-connected winding, similar factors apply for other winding topologies, such as delta connected windings, and phase numbers, for example three- or six-, or even four- or five-phase motors.

To maximize the phase voltage fundamental the timing of rising and falling switching events for each of the transistors in the drive (for example in a three-phase drive there will be six transistor switches) must be optimized. The modulation algorithm used to calculate the duty cycle demands for the switches (that is the ratio of the on-time of the switch to the PWM period), does not in itself determine the maximum available voltage. The phase voltage fundamental is only limited by the final switching algorithm that converts the duty cycle demands into switching edge positions. One convenient form of the modulation algorithm uses Space Vector Modulation (SVM) which is described in more detail below. However, any modulation technique (such as sine-triangle PWM, sine-triangle PWM with triplen injection or SVM) can equally be used without affecting the maximum phase voltage utilization. The primary difference between using the different modulation schemes will be the amount of distorting (non-fundamental) components of the voltage that are produced.

Space Vector Modulation

Referring to FIG. 3, each winding 2, 4, 6 in a three phase system can only be connected to either the supply rail 20 or the ground line 22 and there are therefore eight possible states of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

When the circuit is being controlled to produce pulse width modulation, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time can be calculated by various modulation algorithms as mentioned above.

Figure 4:
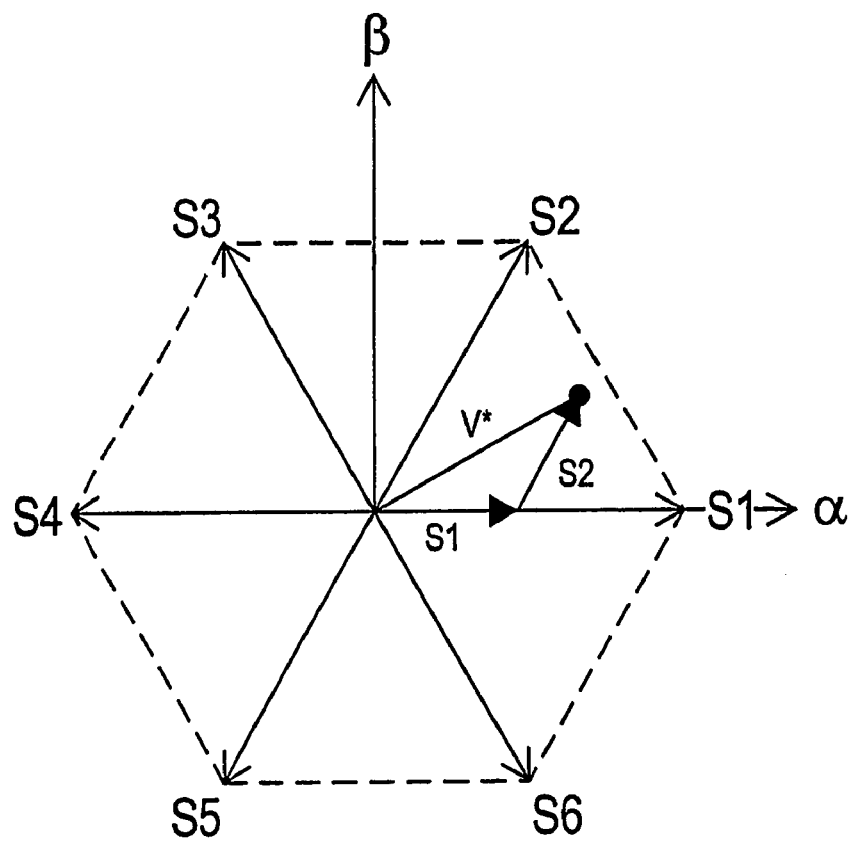
FIG. 4 is a space vector modulation diagram used to describe operation of the circuit of FIG. 1.
Figure 5:
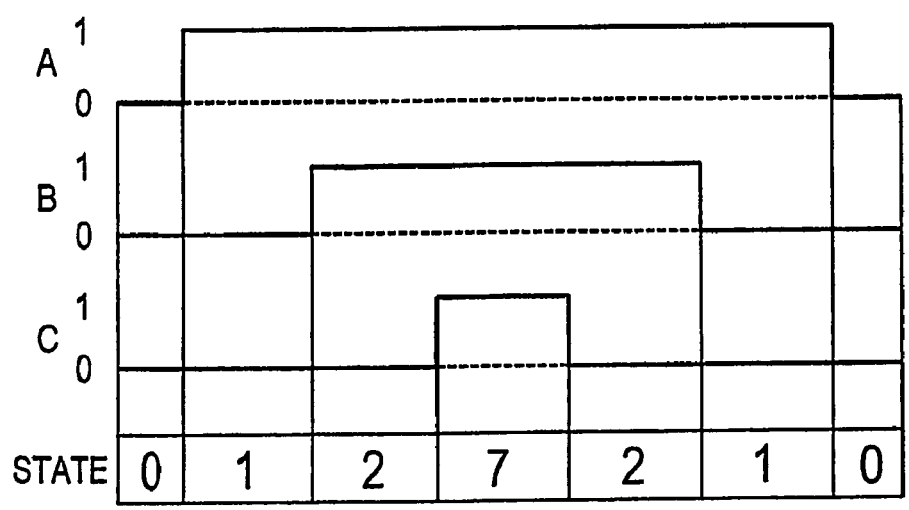
FIG. 5 is a state timing diagram showing a possible modulation used in the circuit of FIG. 1.

Referring to FIG. 4, in state vector modulation systems, the times in each PWM period spent in each of the states are represented as state vectors in a state vector modulation (SVM) diagram. In this type of diagram, single state vectors are those in the directions of the vectors S1 to S6, and the length of the vectors in each of these directions represents the amount of time in each PWM period spent in the respective state. This means that any desired voltage in the windings can be represented as a point on the diagram which corresponds to a voltage vector v* which represents the magnitude and direction of the voltage, and can be produced in the example shown by a combination of state vectors s1, s2, the length of which represent the time in each PWM period spent in that state. FIG. 5 shows a typical duty cycle used to achieve the required voltages, in which the ON time for each phase A, B and C is centred at the centre of the PWM period. This produces two equal periods spent in each of states 1 and 2 and ensures that, at the beginning and end of the cycle, all of the phases are OFF.

If the circuit remains in any one state for the whole of a duty cycle, then the resultant voltage is represented by a vector in one of the directions S1 to S6, the length of which corresponds to the PWM period $T_p$. Because the sum of the time spent in the different states in each duty cycle must add up to the PWM period $T_p$, the range of theoretically achievable voltage vectors is defined by the hexagon shown in FIG. 4 joining the points of the vectors of length $T_p$ in the directions S1 to S6. Any point within this hexagon can be reached from the centre by two state vectors whose lengths, when added together, are less than or equal to $T_p$. In theory this would mean that any demanded voltage vector for a PWM period could be achieved by switching to two correctly selected states, each for the correct duration of time. However, there are various factors which in practice restrict the range of possible voltage vectors, which will now be described.

Figure 6:
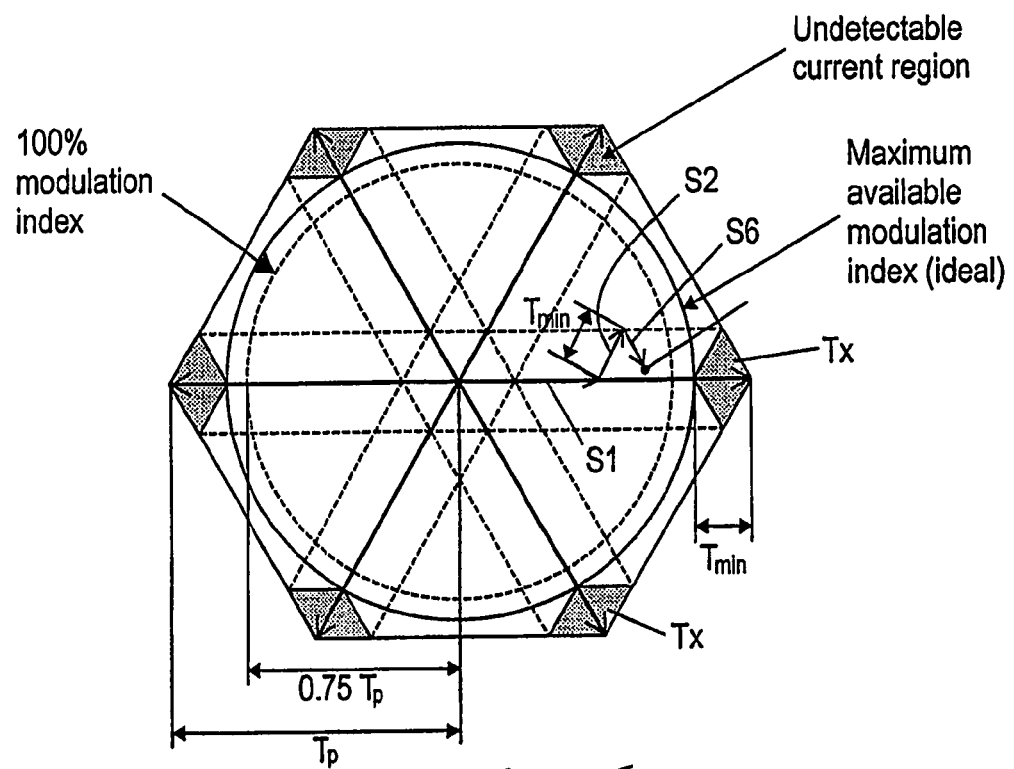
FIG. 6 is a space vector diagram showing aspects of the operation of the system of FIG. 1.

Referring to FIG. 6, the voltage magnitude of the six primary voltage vectors is $2v_{dc}/3$. This is the maximum voltage which can be produced across one of the windings e.g. if it is connected to the supply rail and the other two are connected to ground. A modulation index of 100%, i.e. sine-triangle PWM with no over modulation, results in a fundamental phase voltage of $v_{dc}/2$, giving a modulation depth locus as shown which is a circle of radius 0.75 $T_p$.

Space Vector Modulation with a Single Current Sensor

As mentioned above, most systems have a current sensor in each phase. However, for a single current sensor system, there are further constraints. In a system with a single current sensor, there is a requirement for at least two (in the case of a three phase system) non-zero states (that is states other than state 0 or 7) to be applied for a minimum time $T_{min}$ in each period. This requirement is herein referred to as the minimum state time criterion. This is to allow sufficient time to measure the current in the current sensor to determine the current in all of the phases. In the space vector diagram of FIG. 6 this means that, to reach the desired point on the diagram at least two different vectors must be used with a minimum length of $T_{min}$. Therefore, for areas of the vector space which lie within a distance $T_{min}$ of one of the six primary vectors, the desired voltage vector cannot be achieved from just two primary vector components. Instead, for those areas, three or more primary vector components are used, two of which are of length at least $T_{min}$. An example of this is shown in FIG. 6 where the point in vector space x is reached using a first component s1, a second component s2 which is of length $T_{min}$, and a third component s6 which is shorter than $T_{min}$. This means that, in one duty cycle, the drive circuit will spend time in each of states S1, S2 and S6, but that the time in each of S1 and S2 will be sufficient to allow current measurement by the single current sensor. The only parts of the vector space which are then excluded due to the single current sensor requirement are those in the areas TX. These are the areas corresponding to one state time greater than $T_p - T_{min}$ and another state time less than $T_{min}$.

From FIG. 6 it can be seen that the ideal maximum realisable modulation index for low distortion phase voltages is described by a circle of radius $T_p - T_{min}$. It would be possible to increase the modulation index further by using a non-circular trajectory, however that would produce significant distortion of the phase voltages, and hence significant torque ripple of the machine which would not be desirable. The maximum achievable modulation index is thus $4/3(1 - T_{min}/T_p)$. Therefore, for example, if the PWM period $T_p$ is 49.6 μs, the minimum state time $T_{min}$ is 6.4 μs, the maximum achievable modulation index is 1.16.

Techniques for Calculating the States Required for Single Current Sensor SVM

There are many different techniques that can be used for calculating the individual state-vectors for a given voltage demand vector in single-current sensor SVM.

Two practical methods for doing this are described below.

(a) Explicit Method

The voltage demand magnitude and direction is first calculated in α-β (stator-frame) co-ordinates. From this result the SVM vectors are then calculated.

Figure 7:
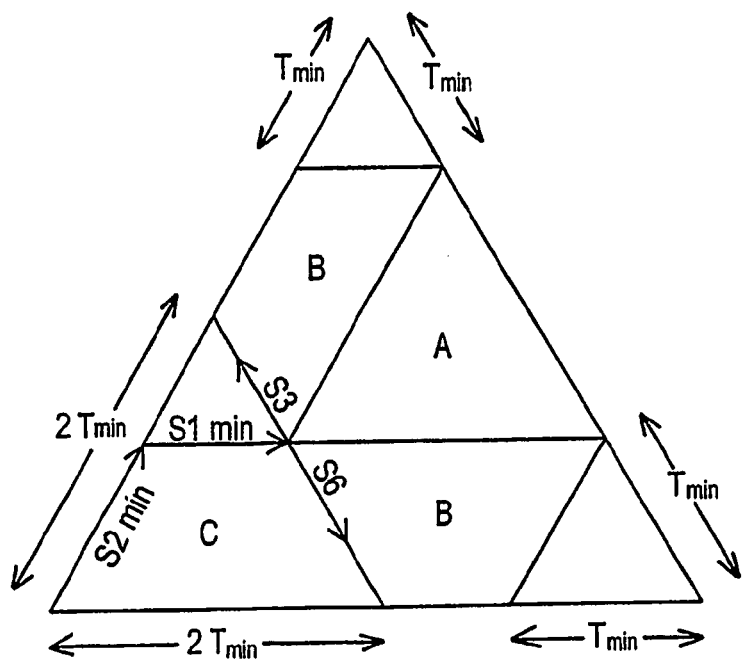
FIG. 7 is a space vector diagram showing further aspects of the operation of the system of FIG. 1.

A first technique is to calculate the vectors explicitly. FIG. 7 shows SVM sector 1, that is the sector between the single state vectors S1 and S2, broken down into the regions where two adjacent vectors (region A), three adjacent vectors (region B) and three or more non-adjacent vectors (region C) are required. To calculate the vectors explicitly, the region of the sector that the voltage demand vector lies in is first determined. For each region, the length of the two, three or four states (depending on the region) can then be calculated uniquely from the voltage demand and system parameters such as $T_{min}$. The states and their lengths are then passed on to the PWM generation algorithm, which calculates the PWM edge positions and current sensor sample points for each phase. The sector may be broken up into a different set of regions to that shown in FIG. 7, depending on the exact algorithms used to calculate the state-vector lengths.

Several different approaches can be used to calculate the state vectors in the other sectors. One method is to rotate the voltage demand vector into sector 1, calculate the state vectors for the sector, and then rotate those state vectors back to the original sector so that they can be correctly applied to the phase windings. Another method is to formulate a different set of equations for every region of every sector of the SVM diagram, so that the state vectors are calculated directly for every part of the vector space. The first technique may be more economical in terms of algorithm size, the second may be more economical in terms of execution speed.

When the individual space vectors have been calculated by the modulation algorithm, the order that the vectors are applied in the PWM cycle and the proportions of the vectors applied must be determined by the switching algorithm. The choice must satisfy both the minimum state time criterion for single current sensor sampling and other practical criteria such as minimising the number of switching transitions for each transistor in bridge in one PWM cycle. It is preferable that the algorithm to accomplish this can take account of which sector the voltage demand lies in, and even which region of the sector, to determine the correct switching sequence.

(b) Implicit Method

In another, implicit method, the duty cycles for each phase are first calculated using a standard SVM algorithm, as though the system had the conventional multiple phase current sensors. There is some choice on how the duty cycles are determined (e.g. for standard centre-aligned PWM, edge-aligned PWM, bus clamping etc), and the actual choice would depend on other factors. It should be noted however that the voltage demand vector must have the same limit as in the explicit method, so that the scope of the voltage demand vectors may not be the same as for a system with multiple phase current-sensors.

Once calculated using the above techniques, the PWM waveforms are then shifted using a suitable shifting algorithm so that the minimum state-time criterion is satisfied to allow sufficient time in each cycle to sample the current in the current sensor. The process of shifting the waveforms implicitly results in a new set of space-vectors, so that there will now be up to four active space vectors, exactly as there are in the explicit method.

The advantage of the implicit method is the simplicity of the algorithm. The advantage of the explicit method is that there is more control over the shape final PWM waveform, which may be exploited for other benefits.

Dead Time Effects

An important factor in the maximum achievable modulation index is the dead-time effect. In a real drive system it is necessary to insert a time delay, herein defined as the dead time, between turning the upper transistor of a phase leg off, and turning the lower transistor of the same phase leg on, and a further delay between turning the lower transistor of a phase leg off, and turning the upper transistor of the same phase leg on. The purpose of this dead-time is to prevent both transistors being turned on simultaneously, which would result in a potentially damaging short-circuit across the DC bus. FIG. 8a shows an example of the command signals for the upper and lower transistors of one phase leg with dead-time inserted. However, the actual terminal voltage provided by the drive is dependant on the polarity of the current flowing in the phase that it is connected to, since this determines whether the upper or lower diode will be conducting during the dead-time. FIG. 8b and FIG. 8c show the actual duty cycle that would be realised, and hence average voltage over one PWM cycle, for positive and negative current polarities respectively.

FIG. 9a shows the terminal voltages that would typically result for an arbitrary phase lag between voltage and current compared with the ideal line voltages which are shown in broken lines. It can be seen that when the polarity of the current changes, there is a step change on the actual voltage that appears at the terminals of the motor. When the current is positive, the voltage decreases, whereas when the current is negative the voltage increases. Since the maximum phase lag between the current and the voltage is 90 degrees, the voltage will tend to decrease when it is near the top of its peak, and increase when it is close to the bottom of its trough. Consequently there will tend to be a reduction in peak to peak terminal voltage. This will therefore cause a reduction in the resulting peak to peak phase voltages, as shown in FIG. 9b. Hence dead-time causes an unrecoverable loss of peak to peak phase voltage under certain conditions.

The maximum achievable modulation index, taking dead-time into account, is thus reduced. In this example, if $T_p$ is 49.6 μs, $T_{min}$ is 6.4 μs and $T_d$ is 0.75 μs the maximum theoretical modulation index becomes 1.12, which is 3.5% less than the maximum achievable voltage fundamental without dead-time.

Increasing the Maximum Phase Voltage Fundamental with a Single Current Sensor System In a conventional drive system with multiple current sensors, the transistor pattern is typically either centre-aligned, for example as shown in FIG. 4, or edge-aligned. In the edge-aligned pattern, the high side transistors for all of the phases are turned on simultaneously at the start of the PWM period, whereas the centre-aligned pattern places the high-side PWM waveforms equidistantly around the centreline of the PWM period. In either case, in each PWM cycle the upper transistor of each phase will be turned on before the upper transistor in any of the other phases is turned off. Similarly, in each PWM cycle the lower transistor of each phase will be turned off before the lower transistor in any of the other phases is turned on. (The only exception to this is when the duty cycle in any phase is either 0% or 100%, in which case there will be no switch transitions for that phase in a PWM cycle.) Consequently, there exists an imaginary line, the centreline, that separates all of the leading edge transitions from all of the falling edge transitions.

A similar constraint could be expected to be satisfactory in a single current sensor system. However, as will be seen, such a constraint, herein referred to as the centreline constraint, will cause an unnecessary reduction in realisable phase voltage. FIG. 10a shows typical transistor commands for a single current sensor system with a centreline constraint. FIG. 10b shows the corresponding commanded space vector states for that period. It can be seen that the centreline constraint results in space vector state 7 appearing in the centre of the PWM period. Since this is a zero-voltage state, it reduces the maximum phase voltage. The width of this zero-voltage state is $T_{tick}$, which is the resolution of the PWM generator. However, when dead-time is taken into account, the actual zero-voltage state that will be applied to the windings will have the width $2T_d+T_{tick}$ under worst case conditions. This is illustrated in FIG. 10c. Thus, the length of the maximum realisable voltage vector, V*, will be reduced by up to $2T_d+T_{tick}$.

Removing the Centreline Constraint

To overcome this limitation, the invention applies two additional requirements to the algorithm that allocates the edge switching points of each of the transistors during one PWM cycle. Firstly, it requires that either the leading edge of the upper and lower transistors or the following edge of the upper and lower transistors in one phase must be allowed to occur at any point in the PWM cycle, regardless of the state of the position of the transitions of the transistors in the other phases, except for when this contravenes the second requirement.

Secondly, it requires that in the portions of the cycle that the demand voltage vector, V*, is composed of three space vectors, the two shorter vectors (which may or may not be the same length as each other) must be sufficiently separated that the dead time of the one space vector must not overlap the other. FIGS. 11a, 11b and 11c illustrate this point. Here the definition of the demanded state vector is the state vector corresponding to the commanded state of the top transistors in the three phases. By this definition, because switching of the bottom transistor, and hence the dead time, can occur before or after the switching of the top transistor depending on the direction of the current in the phase, it can be seen that it is necessary to insert a portion of the longest state of a length of at least twice the dead-time $(2T_d)$ in between the two shortest states in order to ensure that the dead-times of the two states do not overlap for any combination of current polarities in the phases. It can then be seen from FIG. 10c that the actual states that will be applied to the terminals of the machine for the three worst case dead-time conditions with the various possible combinations of polarities of the phase currents $I_A$, $I_B$ and $I_C$ do not contain a zero-volt state in the cycle. This is because even with the insertion of an S1 state between S2 and S6, if it was too narrow such that the dead times would overlap, a zero-volt state would occur.

It should be noted that although the invention is defined in terms of space vectors, it is not necessary to compute the duty cycles for the three phases using Space Vector Modulation. Any modulation scheme (for example sine-trangle PWM, sine-trangle PWM with triplen injection) may be used to compute the required duty cycles of each of the switches, as long as the actual switching patterns of the transistors follow the above definition.

Removing the End Constraints

In a practical system, it is necessary to have a minimum time for which each transistor can be turned on. Turning a transistor on for less than this minimum time could cause unpredictable results and possibly even damage the transistors. The result of this minimum-transistor-on-time, $T_{FET}$, is that the range of duty cycles that can be applied to each phase of the machine is limited. This is illustrated in FIG. 10a, where the maximum duty cycle that can be applied to phase A is limited by the fact that the top transistor must be turned off before the end of the PWM period to allow for the bottom transistor to be turned on for the minimum-transistor-on-time. There is a similar limit on the minimum duty cycle, caused by the fact that the top transistor must be on for $T_{FET}$. The result of this constraint is that under worst case conditions, a zero-voltage state of $T_{FET}+2T_d$ will occur at the ends of the PWM period.

To overcome this constraint in a single current sensor system, the invention requires that the duty cycle for each phase must be allowed to reach 0% or 100%. Thus it is possible for one transistor in one or more phases to be on for an entire PWM period, and for the complementary transistor to be off for an entire PWM period with no switching occurring in that phase for that PWM period.

Since no transistor can be turned on for less than $T_{FET}$, there must be a discontinuous jump in realisable duty cycles from 0% to the minimum duty cycle where both transistors switch in one PWM period, and between the maximum duty cycle where both transistors switch in one PWM period and 100%. Thus the range of realisable duty cycles, defined as the commanded duty cycle, d, for the top transistor of a phaseleg, is either 0 or 1 or within the range:

$$\frac{T_{FET}}{T_p} \le d \le \frac{T_p - 2T_d - T_{FET}}{T_p}.$$

Figure 12:
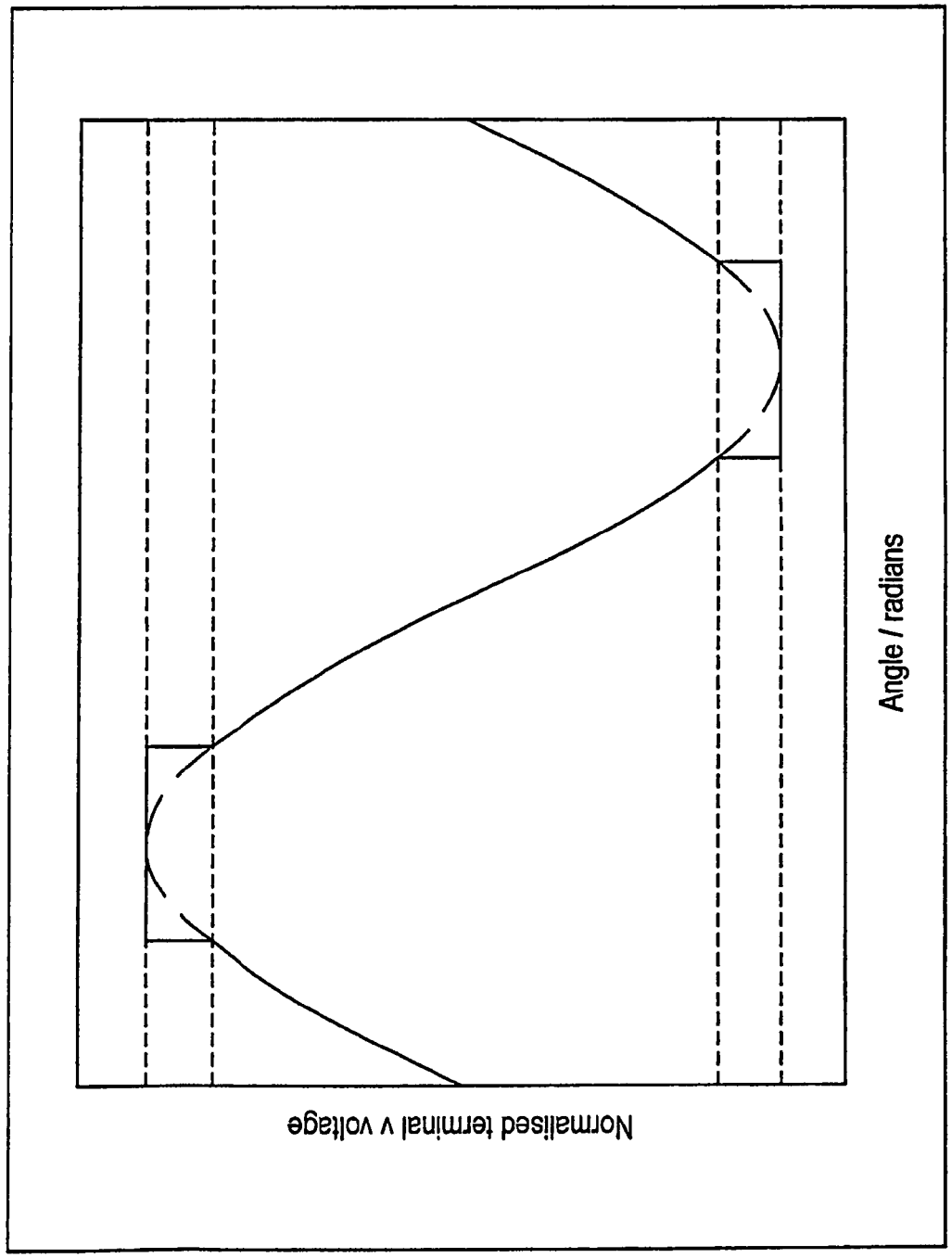
FIG. 12 is a graph showing how the terminal voltages vary with time in further mode of operation of the system of FIG. 1.

One method of implementing this technique is to calculate the desired duty cycles for each phase using a standard modulation technique (for example sine-triangle PWM, sine-triangle PWM with triplen injection, SVM), and limiting the available duty cycle demands in each phase to the range of values defined above. This means that at very high modulation index demands, the peaks of the terminal voltage waveforms will be slightly distorted because they would jump to either 0% or 100% duty cycles as shown in FIG. 12.

An alternative method of implementing the technique would be to use a bus-clamping scheme. In a bus-clamped scheme, the duty cycle demands for all of the phases are calculated using a standard modulation technique (for example sine-triangle PWM, sine-triangle PWM with triplen injection, SVM), and are then modified by increasing or decreasing them all by the same amount so that at least one phase is held at either 0% or 100% duty cycle demand at any point in the cycle (i.e. that phase is clamped to either the positive or negative bus). In a conventional system with multiple current sensors, there is some flexibility in the choice of which phase is clamped to which bus at a given moment. However, in a single current sensor system, in the portions of the cycle where three space vector states are required (region B in FIG. 7) there is only one choice of which phase should be clamped to which bus since only one phase can be in the same switched state for all three states. Furthermore, at low modulation indices, the area where three or more non-adjacent states are required (region C in FIG. 7) bus clamping is not possible. This is because, as can be seen from FIG. 3, for three non-adjacent states there are no switches which are in the same position for all three states. Hence, bus clamping can only be used at high modulation indices. A suitable bus-clamping scheme for high modulation indices would be the 60 degree split-clamped scheme illustrated in FIG. 13. However any arbitrary bus-clamping scheme could be used providing it clamps to the correct bus whilst in region B of FIG. 7. Note that although the bus clamping arrangement is described here in terms of Space Vectors in a 3-phase system, the argument extends to any modulation system and can be extended to any number of phases.

Figure 13:
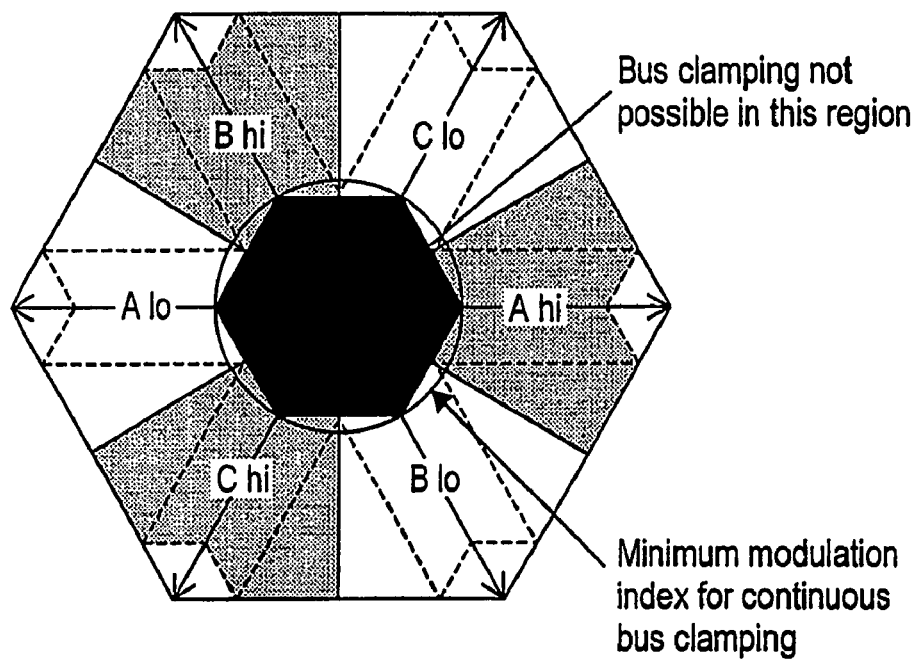
FIG. 13 shows possibilities for bus clamping in a further mode of operation of the system of FIG. 1.

Referring to FIG. 13, in an implementation where bus-clamping is used, some method is needed to switch between bus-clamping and not bus-clamping when the modulation index becomes too low to allow bus-clamping in a single-sensor system as described above. This could be achieved by switching bus-clamping on when some measure of the modulation index, such as the magnitude of the modulation index, the magnitude of the voltage demand vector, or even the rotation speed of the machine exceeded a certain threshold, and turned off when the measure dropped below the threshold again. Hysteresis can be incorporated into the threshold to prevent oscillation between the two modes of operation about the switching threshold which may otherwise lead to acoustic noise or other problems. In an alternative implementation it may be possible to construct the bus-clamping algorithm in such a manner that bus clamping happens automatically in the regions where it is possible (regions A and B in FIG. 7) and does not happen in the region where it is not possible (region C in FIG. 7). To achieve this the algorithm is set up so that all of the zero voltage vectors in one cycle consist entirely of either vector-zero or vector-seven (but not both), and that all of the vectors (zero- and non-zero voltage states) are ordered in such a manner as to achieve bus-clamping in the regions where it is possible with the minimum number of switching states. In the regions where bus-clamping is not possible, this technique will automatically result in a legitimate PWM pattern for single-sensor current sensing that does not incorporate bus-clamping.

Figure 14:
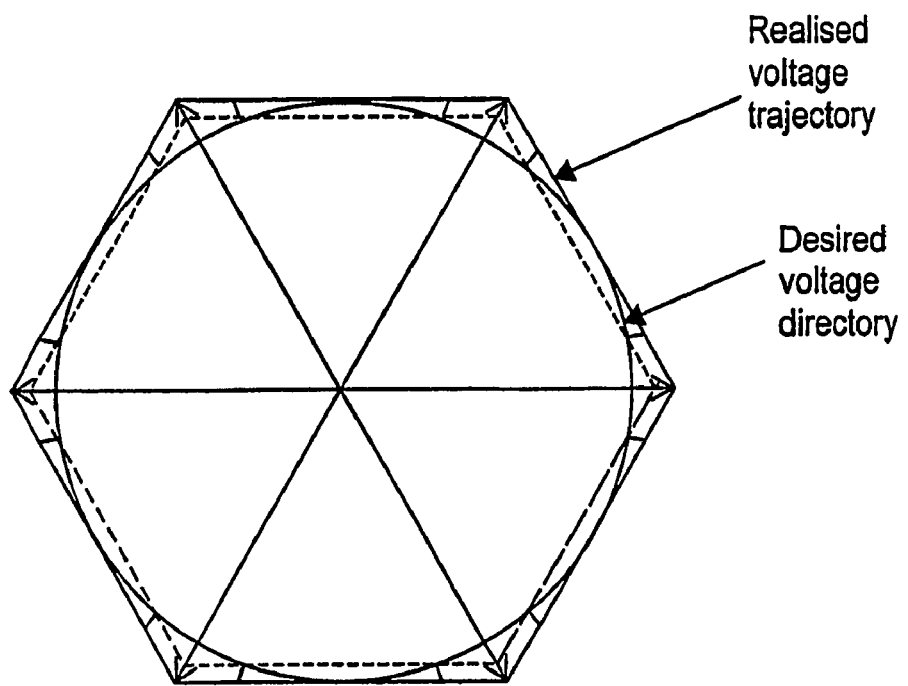
FIG. 14 is a state vector diagram showing the effects of the modes of operation of FIGS. 12 and 13.

The choice of which of these implementations is adopted does not affect the maximum voltage utilization provided the duty cycles are allowed to reach 0% and 100%. In either case there will be some distortion caused by the discontinuous jump in duty cycles around 0% and 100%. The effect of this on the vector space is shown in FIG. 14. It can be seen that at high modulation indices, a portion of the demanded voltage trajectory may lie in the region of the vector space that is not realisable du to the minimum transistor on-time requirement. In this case, the trajectory must be forced onto the hexagonal limit, which results in a distortion of the voltage waveform. However, where the minimum transistor on-time interlock delays are small relative to the PWM period, the magnitude of the distortion will be small. There will be some difference between the two techniques in the distortion of the currents and hence acoustic noise and torque ripple due to higher order effects. It can be envisaged that subtle variations of these implementations can be imagined that could minimise certain acoustic noise and torque ripple criteria.

Phase Sequence Oscillations at Low Modulation Indices

In a single current-sensor system, acoustic noise problems can occur at very low modulation index demands, particularly when the system is in closed loop current or speed control where the demanded value is low compared with the system and measurement noise. At very low modulation index demands, the noise in the demanded voltage vector may be sufficient to cause it to oscillate rapidly between different sectors of the space vector diagram. The bandwidth of these oscillations may be equal to the bandwidth of the current or speed measurement system, and therefore may be much higher in frequency than the rate of transition between sectors normally encountered at such low modulation indices. In a single current-sensor system, the PWM waveform for each phase is offset from the other phases to allow the currents to be sampled. In normal operation, the order of the PWMs for the phases is determined by the space vector sector that the voltage demand lies in as this enables the phase with the largest duty cycle demand to be applied closest to the beginning of the PWM period. Hence, a rapid oscillation between sectors will also cause a rapid re-ordering of the PWM waveforms which results in acoustic noise. At higher modulation indices, the noise component of the voltage demand is much smaller than the average component of the voltage demand and high frequency oscillation will no longer occur.

Figure 15:
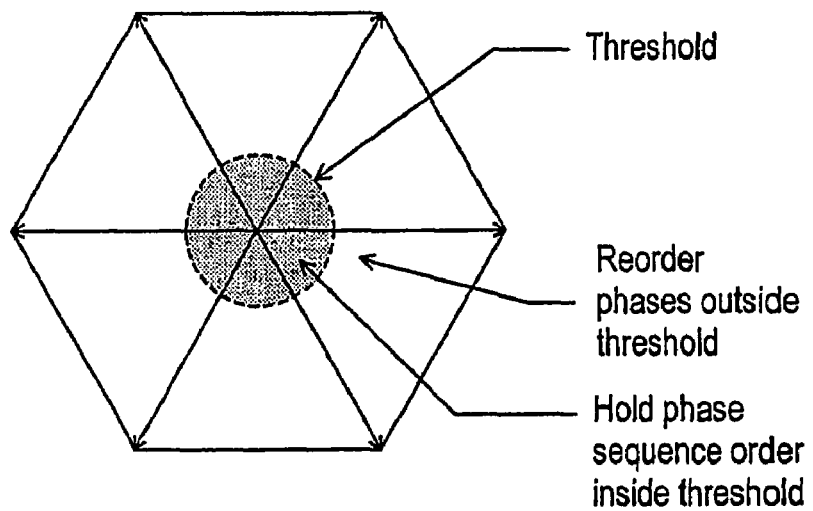
FIG. 15 illustrates a method of inhibiting phase sequence oscillations in the system of FIG. 1.

Referring to FIG. 15 to overcome this acoustic noise problem, the invention proposes stopping the reordering of the PWM waveforms at low modulation indices. When the modulation index is below a certain threshold, the order of the PWM assignments is frozen, and no longer varies from sector to sector. Hence there will be some sectors in which the phase with the largest PWM duty cycle is actually the last phase to start in a PWM period. However, by careful choice of the changeover threshold with relation to the PWM period and the minimum state-time criterion, it is possible to ensure that the modulation indices where the PWM order does not change are sufficiently low that the phase with the largest duty cycle will always reach its turn-off point before the end of the PWM period. When the measure of modulation index goes above the threshold (which may incorporate hysteresis to prevent oscillation between the two modes about the threshold) normal re-ordering of the PWM waveforms will occur. This enables the acoustic noise generation at low modulation indices to be prevented without jeopardizing the voltage utilization at high indices.

Rather than using the magnitude of the modulation index itself as the threshold, it is also possible to use other variables which are related to the modulation index, such as the magnitude of the voltage demand vector, or even the magnitude of the rotational speed of the machine.

Fixing the PWM order has the further advantage that current sample case is also fixed, so that the currents for the three phases are determined by the same samples of the current sensor. If this were not the case the effect of any error in the current measurement (e.g. incorrect determination of current ripple) that was dependant on the phase sequence would appear as high frequency noise on the measured phase currents.

Fixed Edge Assignment for Single Current Sensing

Figure 16:
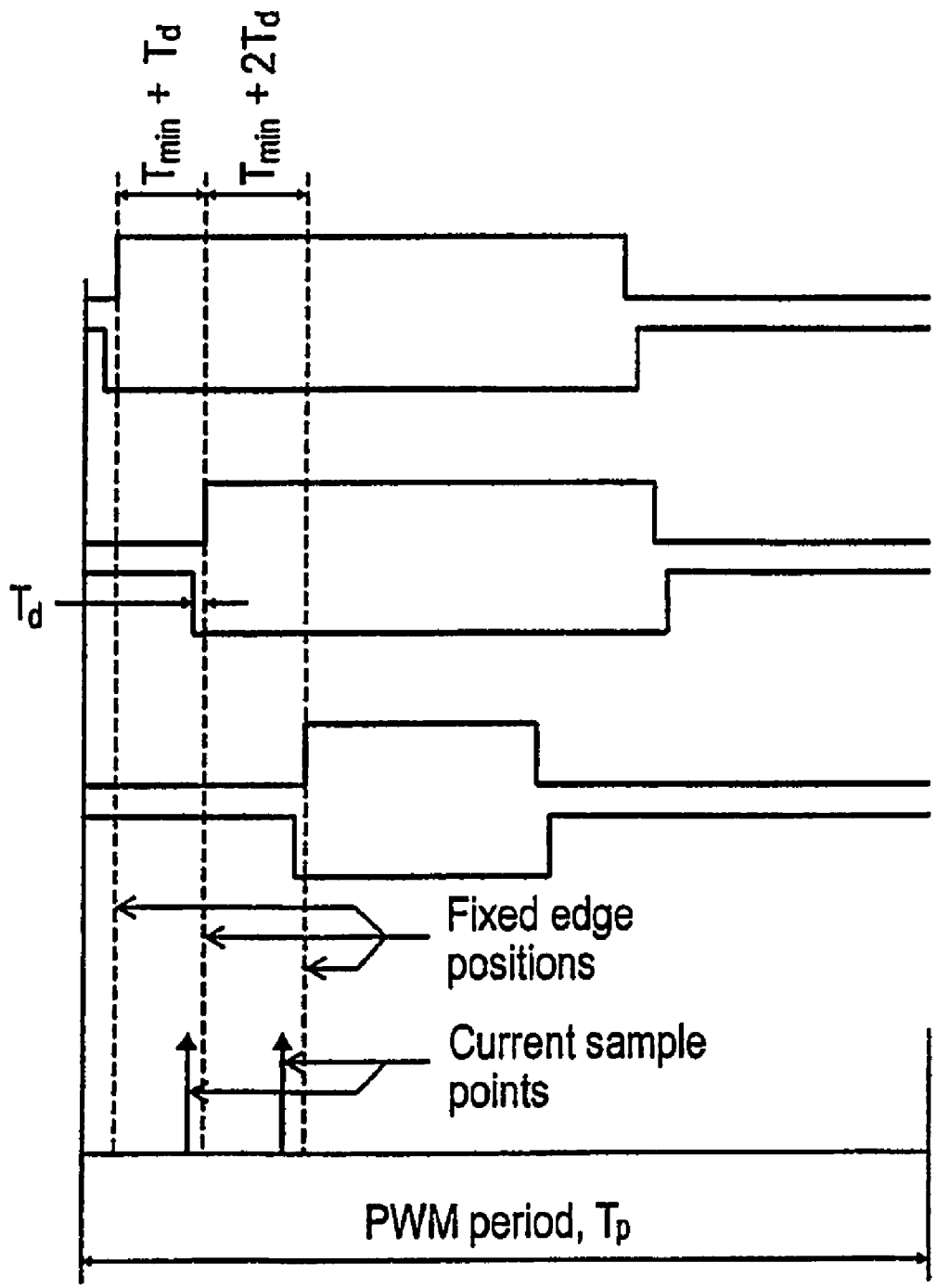
FIG. 16 is a timing diagram showing a switching algorithm according to a further embodiment of the invention.

Referring to FIG. 16, an algorithm to reduce the computational requirements for assigning the PWM edge positions will now be described. In previous single current-sensor algorithms that use PWM shifting to allow enough time to sample the current sensor at all positions, a complex calculation is required to recalculate the position of the rising and falling edges of the PWM pattern of each phase every time the terminal voltage demands are updated.

As shown in FIG. 16, to reduce the computation time, this embodiment of the invention carries out the following operations:

Step 1: Determine the order that the PWM waveforms for each phase will appear in the PWM period.

Step 2: Assign one edge of each PWM waveform to one of three predetermined fixed positions, based on the decision made in step 1.

Step 3: Assign the other edge of each PWM waveform based on the position of the fixed edge and the duty cycle demand.

The decision of the phase sequence order in Step 1 will normally be determined by the relative magnitude of the duty cycle demand (which is in turn related to the Space Vector Sector). In this embodiment the phase with the longest duty cycle demand comes first, and the remaining phases follow in order of decreasing duty cycle demand. This ordering may change in situations where the order is fixed as described above to prevent phase sequence oscillations at low modulation indices.

It will be appreciated that at maximum voltage, the duty cycle of the phase that starts second will be so small that its second edge will occur before the first edge of the third phase starts. Hence the centreline constraint is removed.

The choice of the three fixed edge positions in Step 2 is dependant on the current sensor sample points. One choice for the position of the fixed edges is to fix them near the beginning of the PWM period as shown in FIG. 16. The distance between the fixed positions must be at least $T_{min}$ to allow time for the current sensor to be sampled. When the effects of dead-time and the centreline constraint are taken into account, an example of the positions for the commanded edge positions of the PWM patterns of the 6 transistors in a 3 phase bridge are shown in FIG. 13. The first and second fixed edge positions are spaced apart by time $T_{min}+T_d$ and the second and third fixed edge positions are spaced apart by time $T_{min}+2T_d$. It can be seen here that an extra dead-time has been added before the third fixed edge position which results in the removal of the centreline constraint by ensuring that one phase can turn off before the next one turns on, and that there is a period of $2T_d$ between the two smallest non-zero space vectors.

Other possible choices for the edge positions would be to place all three edge positions at the end of the PWM period, or to fix some at the beginning and some at the end of the period. Any combination of fixed positions are allowable providing they satisfy the minimum state time criterion to allow the current sensor to be sampled at two points in the PWM period to enable the three phase currents to be determined.

Figure 17:
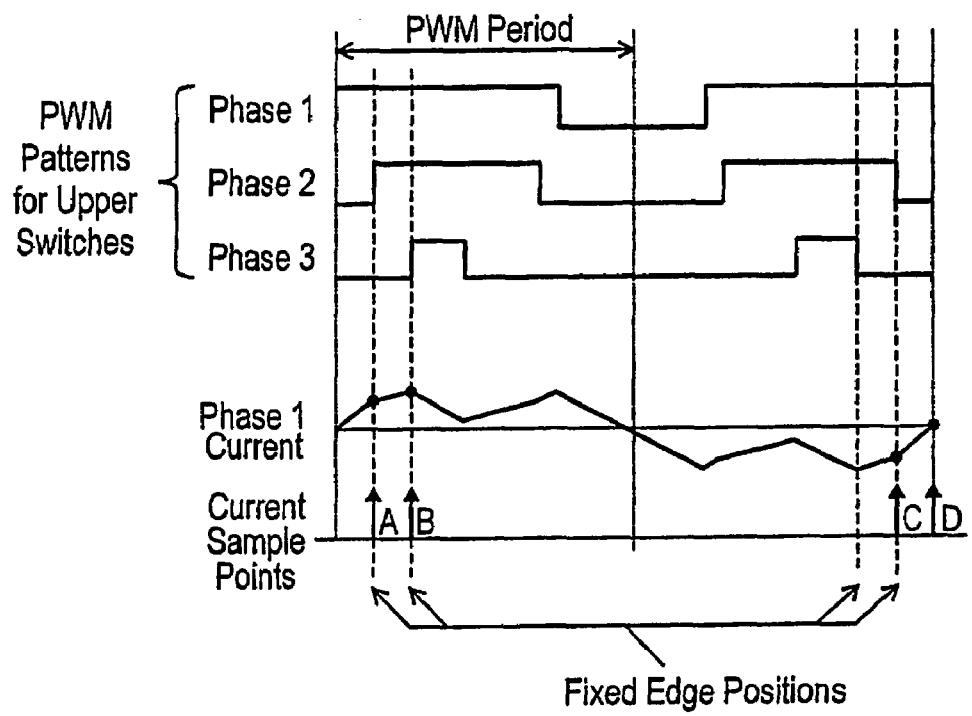
FIG. 17 is a timing diagram showing a switching algorithm according to a further embodiment of the invention.

Referring to FIG. 17, in a further embodiment, the timings of the edges is alternated in subsequent PWM periods, between being left aligned, i.e. fixed at the beginning of the PWM period and being right aligned, i.e. fixed at the end of the PWM period. This means that the current sample points alternate between two different positions in successive PWM periods. As shown in FIG. 17 the phase current varies during each PWM period as a result of the switching between states. Therefore the alternating of sample points means that the current is sampled at different points in the ripple, i.e. when it is at different magnitudes. This enables the current ripple to be estimated and its effects on the measurement eliminated.

The left aligned PWM allows the currents to be measured near the peaks of the current ripple waveform, the right aligned PWM allows them to be measured near the troughs of the current ripple waveform. In this embodiment, the A and D samples read the phase 1 current, whilst the B and C samples read the negative phase 3 current. Ideally, the current ripple characteristic at sample point A would be the exact inverse of the current ripple characteristic at sample point D, so that the average current in phase 1 during two PWM periods could be determined. In practice however, sample D is offset along the waveform from the ideal position by around $T_{min}$, so the exact value of the average current cannot be determined. Despite this, the average of the two current readings will give a better estimate of the average phase current than with the left-aligned PWM pattern alone.

It can be seen that one further advantage of fixing one of the edge positions for each of the PWM signals is that the current sample points can be fixed and no longer need to be calculated each time, which further reduces the computation time requirements.

Abandoning Current Measurements at Very High Modulation Indices.

Referring again now to FIG. 6, in a further embodiment of the invention the maximum modulation index is increased further by removing the requirement for current sensing at high modulation indices. Specifically the voltage vector is allowed to take any position within the outer hexagon of FIG. 6, but whenever it falls within one of the areas TX, where the requirement for two state times of at least $T_{min}$ cannot be met because one of the state times needs to be more than $T_p-T_{min}$, it will not be possible to measure the three phase currents, and perfect current control will no longer be possible. However, this situation only occurs when the magnitude of the voltage demand vector and hence the rotation speed of the machine are very high. Furthermore, in a three phase system the loss of measurement capability only occurs six times in an electrical revolution, and between these times full current measurement is still possible. Consequently, the three phase current measurements will only be lost at very high speeds, and only a fraction of the measurements will be lost in one electrical cycle. To avoid sample rate violations, it is preferable to ensure that the current sample rate is sufficiently high that no more than 50% of the current measurements can be lost at the maximum operating speed of the machine. Furthermore, the lost current measurements are interspersed with actual current measurements, so the frequency at which the missing current measurements occur is high relative to the mechanical time constants of the system.

In certain situations when the voltage vector falls within one of the areas of FIG. 6, the single current sensor algorithm would shift at least one of the PWM waveforms so far that its second edge would end up falling after the end of the PWM period. It is necessary to detect these situations and reduce the shift between the appropriate PWM waveforms, for example by reducing the time between their leading edges, to allow all of the PWM duty cycles to be applied within the PWM period. One way to do this is to alter the timing to reduce the shift on the appropriate PWM waveform so that the second edge of that waveform just falls at the end of the PWM period. An alternative method would be to switch completely to centre-aligned PWM for the samples where the currents cannot be measured. Other variations can be envisaged would achieve the same aim of ensuring that all of the PWM waveforms finish before the end of the PWM period.

In a three phase system, one way of detecting whether the voltage demand vector falls within one of the areas TX is to examine the second largest of the three duty cycles. The voltage vector will fall in the area TX if this duty cycle, after dead-time effects have been accounted for, is either less than $T_{min}$ or greater than $T_p - T_{min}$.

During the times when the currents cannot be measured, an estimate of the current must be calculated and fed to the current controller to enable it to update the voltage demands. The simplest way to estimate the current is to assume that the magnitude and phase of the rotating current vector in the stator will change by such a small amount in one period that it will be essentially unchanged. This assumption is generally valid since the actual magnitude and phase of the current vector tends to change at the same rate as the speed and torque of the machine, which tends to be much slower than the rate at which the current samples are missed.

Hence, when the phase currents cannot be measured, the previous measured value of the magnitude and phase of the current vector relative to the rotor position is input to the current controller, and the current control algorithm run as normal. The current controller continues to update the phase and magnitude of the voltage demands relative to the rotor position which in turn result in the three terminal voltage demands being updated based on the latest value of position in the normal manner. In either case, as soon as the currents can be measured again, the new measured currents are fed to the current controller, and the current controller operation continues as normal.

Alternatively, a model-based estimate of the current can be used during the missing current samples. This estimate computes the expected currents based on the known parameters such as applied voltages, motor speed, motor parameters etc. Furthermore this model-based estimate can be configured as an observer incorporating some form of feedback correction. Furthermore, even though it is not possible to measure all three phase-currents in the areas TX, it is always possible to measure one of the phase-currents in these areas, and this information can be used to further improve the estimate of the current.

An alternative approach to using an estimate of the current in the current-controller is to simply suspend the current-control during the missing samples, and use the previous values of the phase and magnitude of the voltage demands to update the three terminal voltage demands based on the latest value of position. However, if the controller contains some form of integral action, the dynamic response of the controller will change when it is suspended, and some form of compensation may be needed to overcome this effect.

Possible Implementation of a PWM Algorithm to Increase the Fundamental Phase Voltage in a Single Current-Sensor System The exact approach to applying the duty cycles depends on the method used to apply the PWM algorithm. One approach is to update the duty cycles at the beginning of the PWM cycle. This requires that the time of the rising and falling edges for each phase be individually specified, which can be achieved as described below with reference to FIG. 18.

Firstly the duty ratios for the three phases are determined from the alpha and beta voltage demands. These are the two components of the voltage in the frame of the stator is indicated in FIG. 4. The actual choice of duty cycle will depend on a number of factors, such as the modulation method used (for example sine-triangle PWM, sine-triangle PWM with third harmonic injection, SVM), the degree and type of over-modulation allowed etc. These are sorted to determine the largest, middle and shortest duty ratio, phase A, phase B and phase C (in the case of a three phase system).

Then a check is made to determine whether it is possible to measure the dc link currents using the single current sensor i.e. whether the minimum state time criterion is met. If this is not possible the predictive observer is enabled. This keeps the output of the current controllers constant (d,q) axis demand voltages constant) while updating the position (angle) measurement. DC link currents are ignored while the observer is active.

Then for the top and bottom switch of each of the three phases, edge 1, when the transistor is switched on, and edge 2, when the transistor is switched off, are determined as follows.

Figure 18:
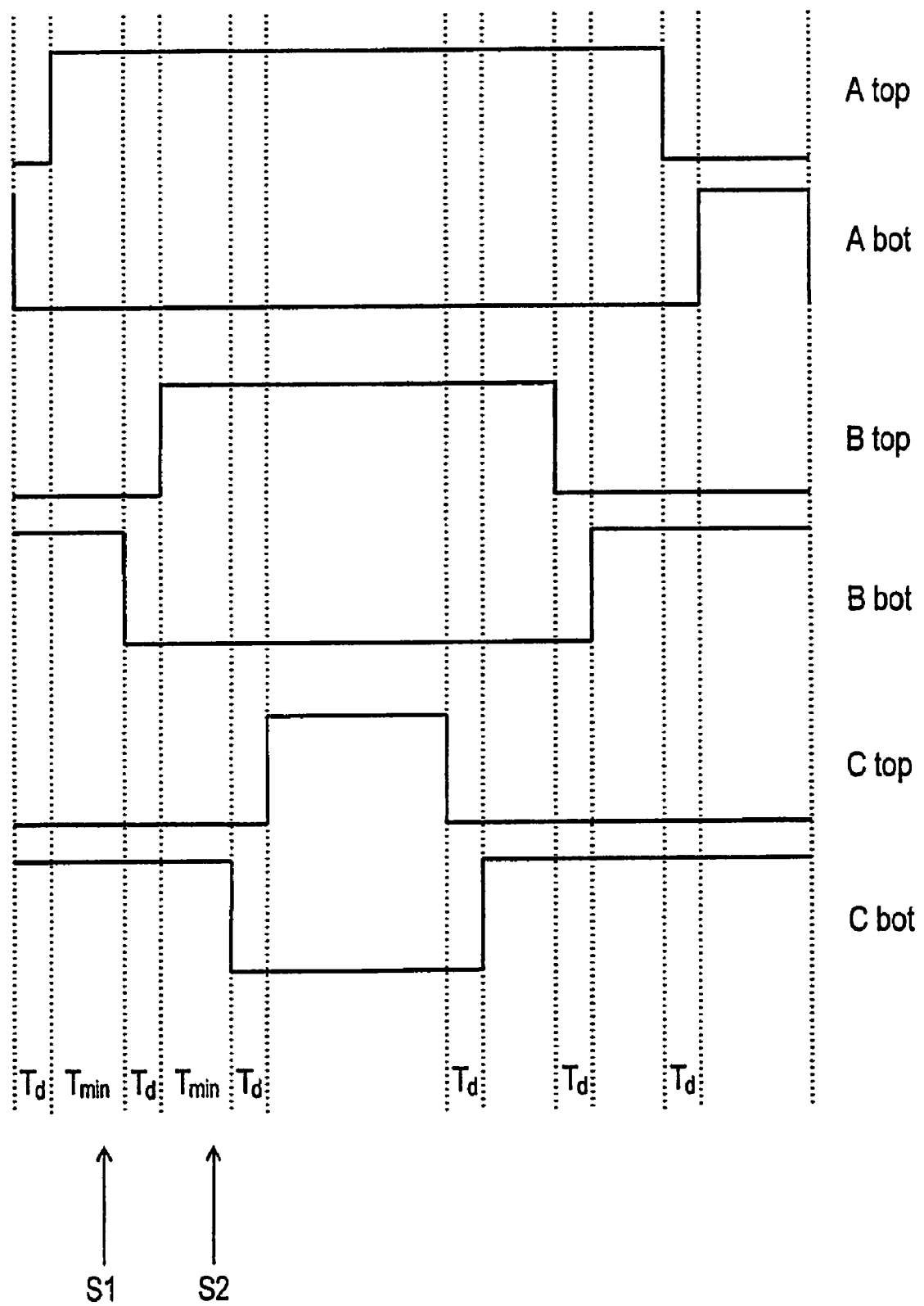
FIG. 18 is a timing diagram showing a switching algorithm according to a further embodiment of the invention.

For a single sensor SVM system the timings could be as follows, as illustrated in FIG. 18.

Phase A (with largest duty ratio):

| | |
|---|---|
| top edge 1 (ON): | $T_d$ |
| top edge 2 (OFF): | $T_d + d_a$ |
| bottom edge 1 (OFF): | 0 |
| bottom edge 2 (ON): | $2 * T_d + d_a$ |

Phase B (with middle duty ratio):

| | |
|---|---|
| top edge 1 (ON): | $2 * T_d + T_{min}$ |
| top edge 2 (OFF): | $2 * T_d + T_{min} + d_b$ |
| bottom edge 1 (OFF): | $T_d + T_{min}$ |
| bottom edge 2 (ON): | $3 * T_d + T_{min} + d_b$ |

Phase C (with smallest duty ratio):

| | |
|---|---|
| top edge 1 (ON): | $3 * T_d + 2 * T_{min}$ |
| top edge 2 (OFF): | $3 * T_d + 2 * T_{min} + d_c$ |
| bottom edge 1 (OFF): | $2 * T_d + 2 * T_{min}$ |
| bottom edge 2 (ON): | $4 * T_d + 2 * T_{min} + d_c$ |

The dc link current samples are then taken and motor phase currents calculated.

The dc current samples are taken at the following time instants:

| | |
|---|---|
| sample S1: | $t_{S1} = T_d + T_{min} - T_{spl}$ |
| sample S2: | $t_{S2} = 2 * T_d + 2 * T_{min} - T_{spl}$ |

Figure 19:
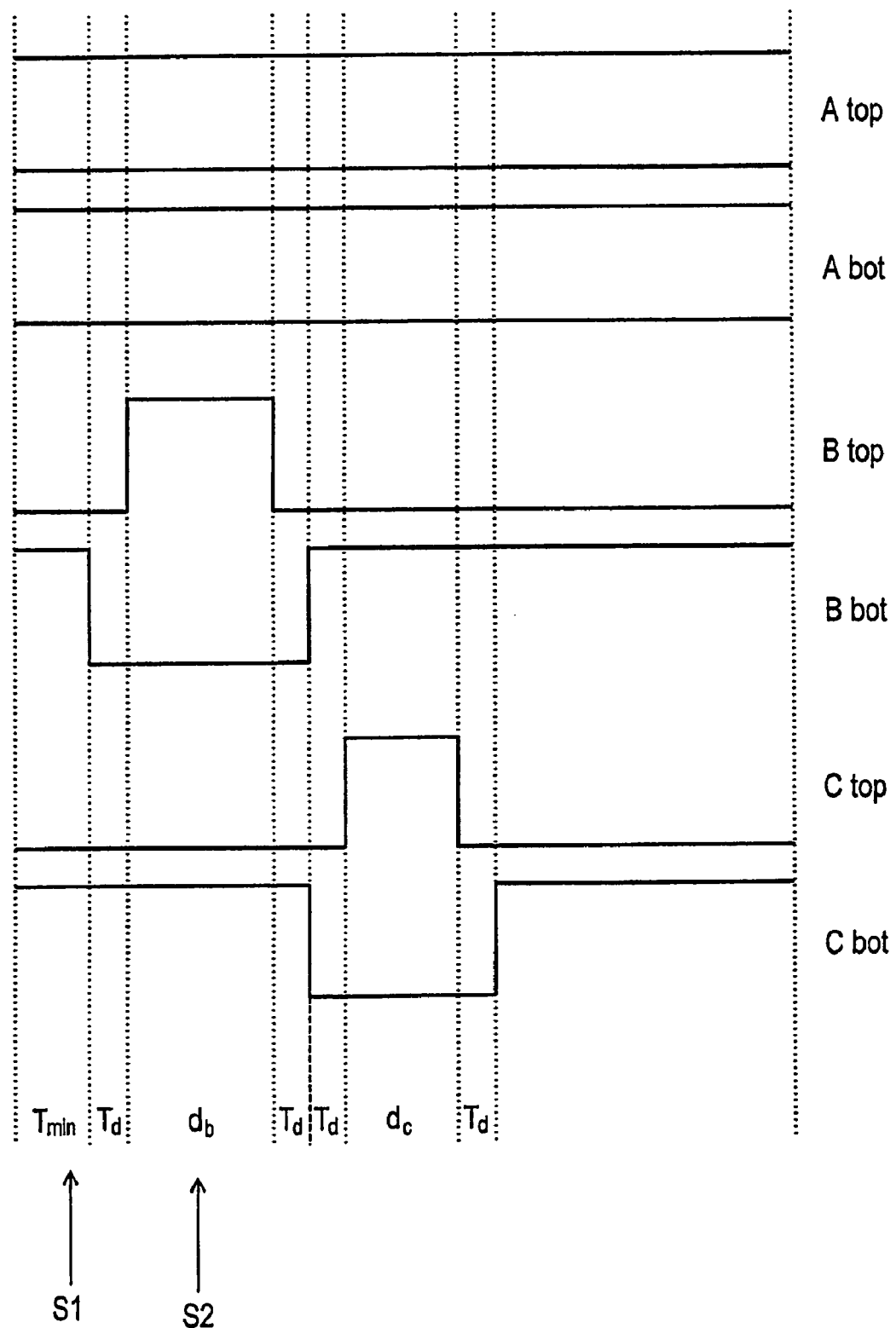
FIG. 19 is a timing diagram showing a switching algorithm according to a further embodiment of the invention.

For a positive bus clamping system the timings could be as follows, as illustrated in FIG. 19.

Phase A (with largest duty ratio):

| top MOSFET: | ON |
|---|---|
| bottom MOSFET: | OFF |

Phase B (with middle duty ratio):

| top edge 1 (ON): | $T_d + T_{min}$ |
|---|---|
| top edge 2 (OFF): | $T_d + T_{min} + d_b$ |
| bottom edge 1 (OFF): | $T_{min}$ |
| bottom edge 2 (ON): | $2 * T_d + T_{min} + d_b$ |

Phase C (with smallest duty ratio):

| top edge 1 (ON): | $3 * T_d + T_{min} + d_b$ |
|---|---|
| top edge 2 (OFF): | $3 * T_d + T_{min} + d_b + d_c$ |
| bottom edge 1 (OFF): | $2 * T_d + T_{min} + d_b$ |
| bottom edge 2 (ON): | $4 * T_d + T_{min} + d_b + d_c$ |

The dc link current samples are then taken and motor phase currents calculated.

The dc current samples are taken at the following time instants:

| sample S1: | $t_{S1} = T_{min} - T_{spl}$ |
|---|---|
| sample S2: | $t_{S2} = T_d + 2 * T_{min} - T_{spl}$ |

Figure 20:
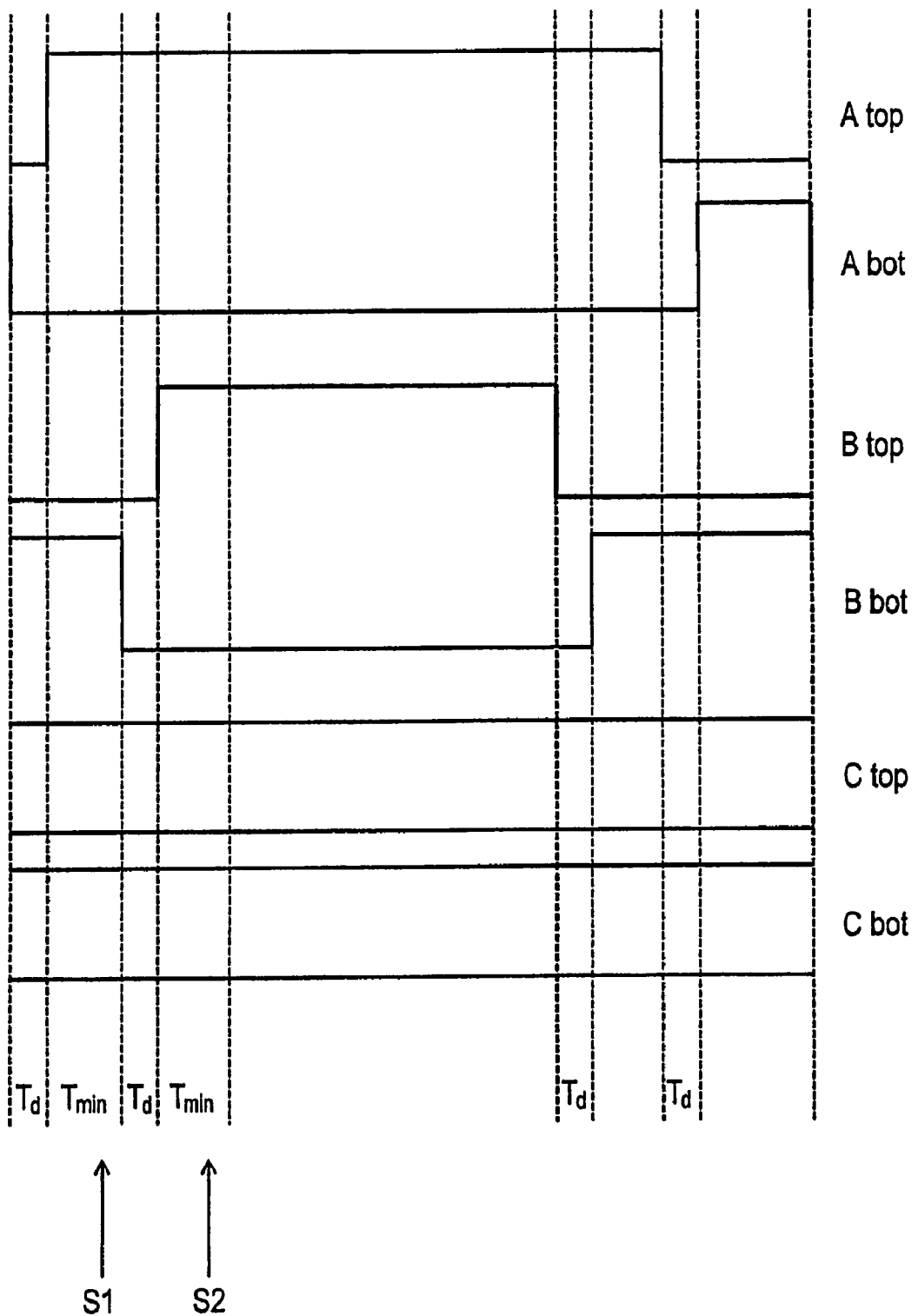
FIG. 20 is a timing diagram showing a switching algorithm according to a further embodiment of the invention.

For a negative bus clamping system the timings could be as follows, as illustrated in FIG. 20.

Phase A (with largest duty ratio):

| top edge 1 (ON): | $T_d$ |
|---|---|
| top edge 2 (OFF): | $T_d + d_a$ |
| bottom edge 1 (OFF): | 0 |
| bottom edge 2 (ON): | $2 * T_d + d_a$ |

Phase B (with middle duty ratio):

| top edge 1 (ON): | $2 * T_d + T_{min}$ |
|---|---|
| top edge 2 (OFF): | $2 * T_d + T_{min} + d_b$ |
| bottom edge 1 (OFF): | $T_d + T_{min}$ |
| bottom edge 2 (ON): | $3 * T_d + T_{min} + d_b$ |

Phase C (with smallest duty ratio):

| top MOSFET: | OFF |
|---|---|
| bottom MOSFET: | ON |

The dc link current samples are then taken and motor phase currents calculated.

The dc current samples are taken at the following time instants:

| sample S1: | $t_{S1} = T_d + T_{min} - T_{spl}$ |
|---|---|
| sample S2: | $t_{S2} = 2 * T_d + 2 * T_{min} - T_{spl}$ |

The quantities referred above are defined as follows:
$T_d$=dead-time (interlock delay);
$T_{min}$=minimum overlap time;
$T_{spl}$=hardware sample time; and
$d_a$, $d_b$, $d_c$=duty ratios of phases A, B, C.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A drive system for a multi-phase brushless motor comprising a plurality of phase windings, the system comprising:
   a drive circuit including switch means for varying the electric potential applied to each of the phase windings by switching said drive circuit between a plurality of states;
   a current sensor operable to sense the instantaneous total current flowing through the windings, and
   control means operable to provide pulse width modulated drive signals to control said switch means so as to control the time that said drive circuit switches between said states in each of a series of pulse width modulation periods as a function of a demanded voltage which has one of a plurality of space vector modulation sectors associated with it; wherein the control means is arranged to inhibit a change, between two adjacent periods, of the order in which said switch means are switched within said periods resulting from a change between said two adjacent periods of said space vector modulation sector of the demanded voltage, when said demanded voltage is low, but to allow such change of order when said demanded voltage is high.

2. A system according to claim 1 wherein said control means is arranged to define a threshold of a parameter of the system below which said change of order is inhibited.

3. A system according to claim 2 wherein said parameter is a modulation index.

4. A system according to claim 1 wherein said control means is arranged to inhibit said change of order such that said change of order is prevented.

5. A system according to claim 1 wherein said control means is arranged to inhibit said change of order by providing hysteresis in changes of said order.

6. A system according to claim 5 wherein said control means is arranged to provide hysteresis in the switching between a first state where said change of order is allowed and a second state where said change of order is prevented.

7. A system according to claim 1 wherein said control means is arranged to control the switching times of said switch means so that sufficient time is spent in a sufficient number of active states for the current in each of the phases to be determined by means of said current sensor.

8. A system according to claim 1 wherein said switch means comprises a plurality of switches.

* * * * *